United States Patent
Kunze et al.

(10) Patent No.: US 8,175,361 B2
(45) Date of Patent: May 8, 2012

(54) METHOD AND APPARATUS FOR THE ARTIFACT-REDUCED DETECTION OF A 3D OBJECT IN TOMOGRAPHIC IMAGING

(75) Inventors: Holger Kunze, Bubenreuth (DE); Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1091 days.

(21) Appl. No.: 12/068,678

(22) Filed: Feb. 11, 2008

(65) Prior Publication Data

US 2008/0205737 A1    Aug. 28, 2008

(30) Foreign Application Priority Data

Feb. 23, 2007 (DE) .......................... 10 2007 009 429

(51) Int. Cl.
*G06K 9/00* (2006.01)
(52) U.S. Cl. ...................................................... 382/131
(58) Field of Classification Search .................. 382/128, 382/131, 132, 285; 378/4, 901
See application file for complete search history.

(56) References Cited

U.S. PATENT DOCUMENTS 6,907,102 B1 *  6/2005  Sauer et al. ...................... 378/19

OTHER PUBLICATIONS

Holger Kunze, Wolfgang Härer, Karl Stierstorfer Iterative extended field of view reconstruction Medical Imaging 2007: Physics of Medical Imaging. Edited by Jiang Hsieh, Michael J. Flynn, Proceedings of SPIE—vol. 6510, 65105X; Others.
Buzug Einführung in die Computertromographie 1. Auflage 2004, Springer, ISBN 3-540-20808-9, S. 134-137.
Kak, Slaney Principles of Computerized Tomographic Imaging. 1987, IEEE Press. ISBN 0-87942-198-3 S. 275-296.
Robert, N., F. Peyrin, M.J. Yaffe Binary vascular reconstruction from a limited number of cone beam projections Med. Phys. 21 (1994), 1839-1851.
S. Schaller, O. Sembritzki, T. Beyer, T. Fuchs, M. Kachelriess, T. Flohr An Algorithm for Virtual Extension of the CT Field of Measurement for Application in Combined PET / CT Scanners RSNA 2002 Vortrag.
German Office Action. Jan. 2008.

* cited by examiner

*Primary Examiner* — Jurie Yun
(74) *Attorney, Agent, or Firm* — Harness, Dickey & Pierce, P.L.C.

(57) ABSTRACT

In order to regularize a reconstruction method associated with computed tomography (CT), in at least one example embodiment, information relating to the statistics of the attenuation values of the reconstructed object is also included in the form of the logarithmic probability function of the attenuation values. This information can be obtained from the regions of those image parts which are still completely contained in a scanning field of view (SFOV), but nevertheless lie in the vicinity of the region where the object leaves the SFOV. Furthermore, the information may be used in an algebraic reconstruction method by adding a boundary condition term to the cost function to be minimized.

18 Claims, 7 Drawing Sheets

METHOD AND APPARATUS FOR THE ARTIFACT-REDUCED DETECTION OF A 3D OBJECT IN TOMOGRAPHIC IMAGING

PRIORITY STATEMENT

The present application hereby claims priority under 35 U.S.C. §119 on German patent application number DE 10 2007 009 429.0 filed Feb. 23, 2007, the entire contents of which is hereby incorporated herein by reference.

FIELD

Embodiments of the present invention relate in general to tomographic imaging (for example computed tomography, CT) such as is applied in medicine in order to examine patients, but also in contactless test engineering (for example checking weld seams). In this respect, embodiments of the present invention may relate in particular to a method and/or an apparatus for carrying out the method that makes use in the field of nondiscrete, tomographic imaging of an iterative image reconstruction by which image artifacts resulting from inadequate projections can be reduced or even eliminated.

BACKGROUND

Tomographic imaging methods are distinguished in that it is possible to examine internal structures of a patient or of a test object without having in the process to operate on the patient or to damage the test object. One possible type of tomographic imaging is to record a number of projections of the object to be examined from various angles. A 3D description (a virtual 3D model which can be represented in the computer) of the object can be calculated from these projections.

A standard method for this calculation is "filtered back projection", FBP, (described in "Buzug: Einführung in die Computertomographie [Introduction to computed tomography]. 1st edition 2004. Springer. ISBN 3-540-20808-9" and in "Kak, Stanley: Principles of Computerized Tomographic Imaging. 1987, IEEE Press. ISBN 0-87942-198-3). What is involved here is an analytical method in which the projections are filtered and back projected onto the image.

However, this method can be used to reconstruct only points for which beams are present from an angular range of at least 180°. If this requirement is not met, strong visible artifacts result in the reconstructed image. This problem occurs with particular severity in medical computed tomography, where it is possible as a rule to reconstruct exactly all the points inside a circle, but not points outside the circle, for which reason organs or organ parts (for example arms, pelvis etc.) located in the outer region of the circle are affected by strong artifacts. For such points in the outer region, the detector is too small (or the object too large), and so these can no longer be projected thereon from all directions. This situation is particularly problematic when the aim is to determine the contour of the object to be reconstructed. Even this is no longer directly possible in such a case.

Currently, the standard solution to this problem is to estimate the missing projection beams and thereby to supplement the respective projections to the extent that the entire object is imaged on all projections. Filtered back projection (described in "S. Schaller, O. Sembritzki, T. Beyer, T. Fuchs, M. Kachelriess, T. Flohr, "An Algorithm for Virtual Extension of the CT Field of Measurement for Application in Combined PET/CT Scanners", RSNA 2002 Vortrag") is subsequently applied to the projections thus supplemented. This method is not exact and is very susceptible to error.

Iterative methods (for example the "algebraic reconstruction technique ART" or the "simultaneous algebraic reconstruction technique SART") are also proposed for such problematic reconstruction methods in the same literature. Iterative methods are based on the principle that the measured projections are compared with the projections calculated from the object already reconstructed, and the error is subsequently applied for the correction of the image of the object. For example, in this case the image in the nth iteration $X_n$ is calculated as follows with the aid of the update equation:

$$X_n = X_{n-1} + \hat{R}(Y - \hat{P}X_{n-1}) \quad (1)$$

The iteration is begun by suitably initializing the starting image $X_0$ (for example with the zero image by filling all the object values with zeros for the present). Here, $\hat{P}$ in the above equation (1) represents the system matrix with the aid of which the respective projections are calculated from the scanned object image using knowledge of the scanning geometry. $\hat{R}$ is the back projection operator.

So-called secondary conditions, for example in the form of a density distribution of the basic object material, can still advantageously be introduced into these iterative methods during the reconstruction. Specifically, it is described in the literature that such iterative methods can be used or applied successfully for the reconstruction in the case of the problem presented here when, in particular, it is known that the object consists only of one material and the formulation of the problem can be reduced to whether material is present or not at a specific point ("Robert N., F. Peyrin and M. J. Yaffe, Binary vascular reconstruction from a limited number of cone beam projections, Med. Phys. 21 (1994), 1839-1851").

In this case, the formulation of the problem in which only a single type of material must be reconstructed is denoted as "discrete tomography". In the latter, a threshold value analysis is applied to the image during the reconstruction, generally after each iteration, in order to take the decision on "material yes or no". It is very problematic and therefore disadvantageous in the case of a discrete tomographic threshold value analysis that, on the one hand, a pixel is allocated only to a specific class (material/no material), while on the other hand this allocation can be corrected again—if at all—only by a very high number of iterations.

SUMMARY

In at least one embodiment of the present invention, a method is provided that makes use in the context of nondiscrete tomographic imaging of an iterative image reconstruction by which it is possible to reduce or eliminate image artifacts resulting from inadequate projections.

According to at least one embodiment of the invention, a method is disclosed for producing a 3D data record of an object on the basis of iterative calculation from a plurality of 2D data records generated tomographically on this object in association with the problem of truncated projections is proposed, in which in addition to a difference term a cost function to be minimized in the iteration has a regularization term that takes account of boundary conditions and in which the probability density function of the attenuation values of the object components are taken into account.

In a first embodiment of the inventive method, the regularization term can be determined by assigning the appropriate probability to the discrete material composition of the object in accordance with the attenuation coefficient of the respective object component.

In a second embodiment of the inventive method, the regularization term is determined by a histogram that is estimated over the entire object or over the subregion of the object respectively of interest.

In a third embodiment of the inventive method, the regularization term is determined by a histogram that is estimated over the inner region, lying inside the SFOV measuring field, of the image respectively to be reconstructed.

It is particularly advantageous in this case when the basic histogram is smoothed.

It is, furthermore, advantageous when the regularization term has a multiplier by which a weighting can be undertaken between the regularization term and difference term.

It is also advantageous according to at least one embodiment of the invention when only pixels/voxels/points which it is known cannot be calculated exactly owing to incomplete data from incomplete projection are input into the extended cost function to be minimized.

According to at least one embodiment of the invention, the imaging method of the apparatus is founded on an X-ray-based, a magnetic resonance-based, an ultrasound-based or an optical tomography method.

BRIEF DESCRIPTION OF THE DRAWINGS

Further advantages, features and properties of the present invention are explained below in more detail with the aid of example embodiments and with reference to the accompanying drawings, in which.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 12:
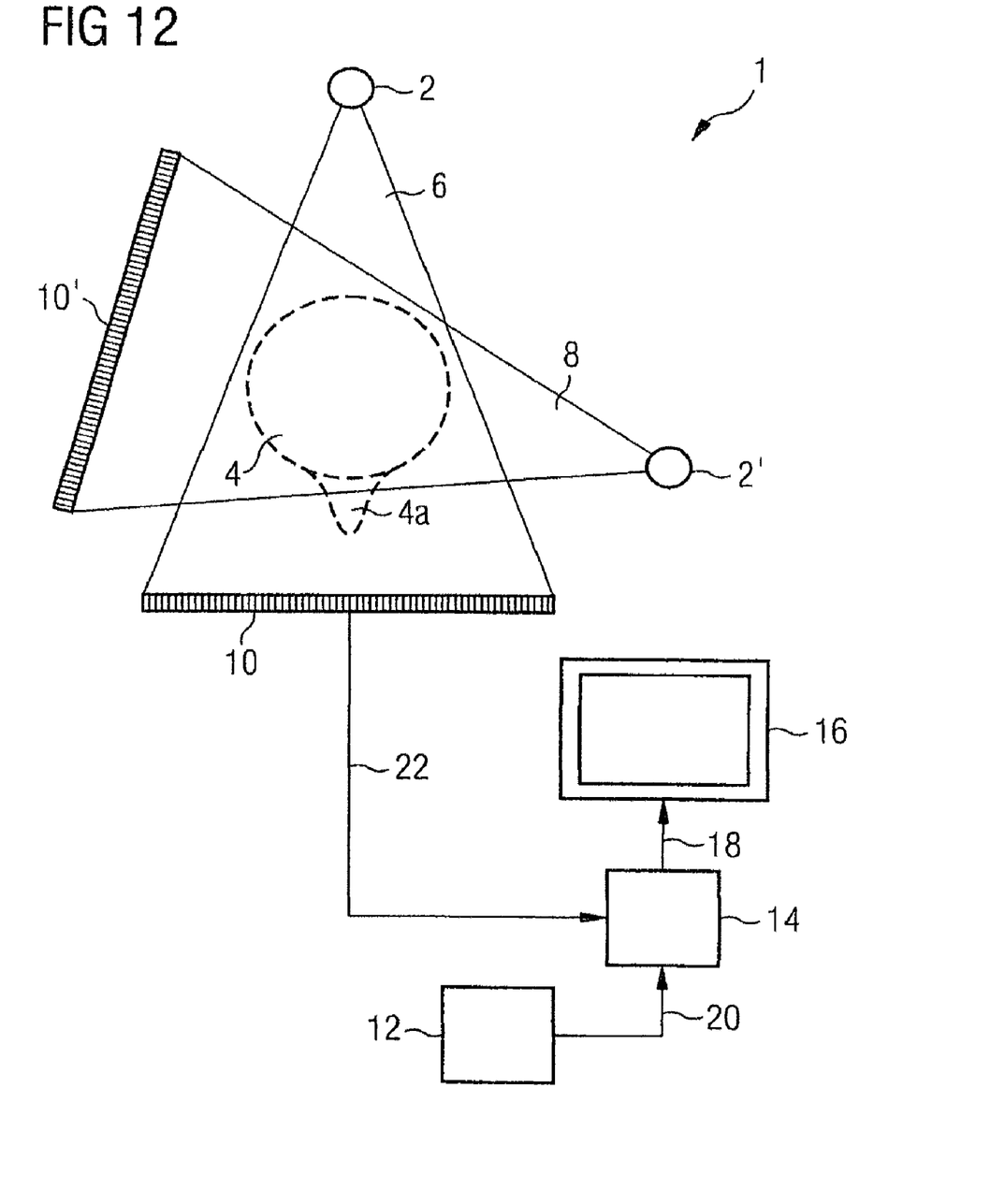
FIG. 12 shows a schematic of a tomographic imaging and image processing apparatus (for example CT unit) for iterative generation of a 3D data record.

A problem on which an embodiment of the present invention is based, namely that of truncated projections illustrated more fully later, is a general problem of tomographic imaging and is to be explained below—without restriction of generality—with the aid of computed tomography (CT):

FIG. 12 shows a CT arrangement 1 for detecting an object 4 in three dimensions. The arrangement 1 includes an X-ray source 2, the X-ray source 2 being designed to emit a conical X-ray beam 6. The arrangement 1 also comprises a detection plane 10 with a detector matrix, the detector matrix having a multiplicity of raster matrix elements.

The raster matrix elements are respectively designed to detect an X-ray and to generate an output signal corresponding to the X-ray.

The arrangement 1 also has an evaluation computer 14, an image reproduction unit 16 and a user interface 12.

The user interface 12 is connected to the evaluation computer 14 via a connecting line 20 and the image reproduction unit is connected to the evaluation computer 14 via a connecting line 18. The evaluation computer 14 is connected at least indirectly to the detection plane 10 via a connecting line 22. The detection plane 10 can be a component of a computer tomograph.

Also illustrated is the X-ray source 2 in another detection position 2'. The detection plane 10, which can be connected to the X-ray source 2 via a C arc, for example, is illustrated in another detection position 10'.

The object 4 also has an object part 4a that is located outside a common detection region in this exemplary embodiment, the common detection region being formed by an overlapping region of an X-ray beam 6 emitted by the X-ray source 2, with a beam 8 emitted by the X-ray source 2 in the position 2'. The object 4 without the object part 4a is located in the common detection region. The common detection region can be reconstructed with a low probability for the occurrence of artifacts from 2D data records generated from the detection plane 10, and so a 3D data record can be generated by the evaluation computer 14, the 3D data record representing the object 4 in three dimensions.

The object part 4a is located outside a common detection region. The object part 4a can therefore be reconstructed as part of a 3D data record only with a higher probability of artifacts to the extent that only a simple method known from the prior art can be applied in the reconstruction.

The evaluation computer 14, the user interface 12 and the image reproduction unit 16 may form an image processing apparatus. The evaluation computer 14 can have an interface—not illustrated in this figure—for connection to a computer tomograph.

The evaluation computer 14 can have a weighting discriminator designed to generate a 3D data record from a plurality of 2D data records received via the connecting line 22 in accordance with a predetermined assignment rule. Via the connecting line 18, the evaluation computer 14 can output the 3D data record thus generated by reconstruction from 2D data records, doing so for the purpose of reproduction by way of the image reproduction unit 16. The generation of the 3D data record from 2D data records received on the input side via the connecting line 22 can be performed by the evaluation computer 14 as a function of a user interaction signal received via the connecting line 20.

The user interaction signal can be generated by the user interface 12, which can be designed as a keyboard, a keypad, as a touch-sensitive surface or as a trackpad, or a comparable user interface.

The evaluation computer 14 can advantageously have an FPGA apparatus or an ASIC (ASIC=Application Specific Integrated Circuit) apparatus, (FPGA=Field Programmable Gate Array).

As already mentioned, truncated projections or incomplete data with regard to an object that stretches over the scanning field of view (SFOV) constitute a general problem in computed tomography. Reasons for this are, for example, (as shown in FIG. 12) that the object is larger than the SFOV, or that the patient is positioned such that parts come to lie outside the SFOV, the purpose of the latter being, for example, to reduce the exposure of sensitive organs to the X-radiation. The problem thereby arising is the same in all cases: in this case there are always some parts or other of the object that are to be reconstructed, which, however, it is not possible to obtain line integrals from an angular range of at least 180°.

Since the corresponding or associated projections are incompletely measured or, to put it vividly, are "truncated", this problem is denoted and described in the literature as "truncated projection(s)". The problems arising in the matter of "truncated projection" can, furthermore, be subdivided into a case of "severely truncated projections" and into a case of "not severely truncated projections". In the first case—just as in some SPECT applications—all the projections are truncated to both sides, since in this case the object is larger in each projection direction than the SFOV. The problem of severely truncated projections is, however, not considered in this invention.

Not severely truncated projections (referred to below as "truncated projections") are measured in the case of objects for which only some parts come to lie outside the SFOV. In the case of filtered back projection (FBP) as a reconstruction method, the reconstructed image then generally has substantial defects, specifically just where the object projects from the SFOV (the filter step requires that the attenuation at the ends of the projections reduce to zero).

Novel reconstruction methods have recently been developed that permit an exact reconstruction even for truncated projections if projections from an angular range of at least 180° are obtained for all the points of the region of interest (ROI), and there exists in relation to all the points of the ROI straight lines that penetrate only regions that can be reconstructed exactly. When, however, data points are to be reconstructed for which not all the required projections can be obtained, these novel algorithms fail or can achieve nothing.

The current standard solution to this problem is still to expand the projections and to carry out an FBP with the aid of these expanded projections. Thus, for truncated projections (or incomplete projections) that the truncated part of the projections of the object is estimated. The estimation is usually performed by fitting projections of a circular or elliptical water cylinder onto the measured projections such that the projection data at the truncation of the measured projections can be appropriately matched with regard to magnitude and gradient.

Iterative reconstruction methods that are claimed to be able to solve such problems more effectively than analytical reconstruction methods have not yet been adequately checked for the purpose of reconstructing truncated projections in the context of medical applications. Analytical derivatives and reconstruction studies in which use was made of the analysis of individual values have shown that an exact reconstruction is possible in principle when use is made of an iterative reconstruction method. However, it has been shown in practice that the exact modeling of the measurement process leads to enormous artifacts. For the purpose of reducing artifacts, the prior art recommends the use of an elliptical profile or a denser reconstruction grid. Both are generally not feasible, since the object to be reconstructed is frequently not elliptical, or else contains holes, and a fine grid is already being used in most CT applications, in any case.

As already mentioned in the introduction to the description, there are iterative reconstruction methods functioning in tomography in the case of which only a single material is reconstructed (already denoted as "discrete tomography"). The sole information item of "material yes or no" for a specific pixel features in the iterative reconstruction method as a so-called boundary condition. This may be sufficient for material testing, but—in the interest of a higher image resolution—a higher level of differentiation is to be sought in medical imaging, in which the aim is to detect, tomographically, objects (organs of the human body) that have a multiplicity of materials and/or components (different tissue types: muscle tissue, bone tissue, nerve tissue, fat tissue, lung tissue, white and gray brain matter, blood, arterial, venous system etc.).

An embodiment of the present invention extends existing discrete iterative reconstruction methods in tomographic imaging such that these master a highly differentiated material distribution and, in particular, enable the reconstruction of an image that is highly resolved with regard to type of material and material density distribution and is still free from artifacts or has reduced artifacts when only inadequate sets of projections are present.

Extending the reconstruction methods is performed according to an embodiment of the invention by introducing an a priori item of information relating to the statistics of the material-related attenuation values of the object to be reconstructed, doing so on the basis of a probability function. This is formed from a logarithmic probability distribution of the material-related (substance-related) attenuation values. This extension is embedded in an algebraic reconstruction method by adding a boundary condition term as regularization functional to the cost function that is to be minimized. Experiments indicate that in the case of not severely truncated projections such as occur more frequently in CT applications, for example, this a priori item of information is to, or must, be obtained only from the region that lies in the vicinity of the object region projecting from the SFOV, or in said object region itself, or that covers the latter, so as to be able to obtain good estimates across the object.

Algebraic reconstruction algorithms minimize the quadratic error between measured projections Y and calculated projections. Let there be given a scanned acquired image X, the calculated projections being determined by a projection operator A. If X and Y are written as vectors, A can be described by a sparsely filled matrix whose entries describe the influence of a pixel $x_i$ on a specific projection beam $y_j$. The optimized cost function of this algebraic reconstruction can therefore be written as follows:

$$\epsilon = \|Y - AX\|^2 \quad (2)$$

The application of iterative algorithms—such as the algebraic reconstruction technique (ART) or the simultaneous algebraic reconstruction technique (SART); SART minimizes the quadratic error between calculated and measured projections—to the problem of truncated projections leads (without the introduction of boundary conditions) to unsatisfactory solutions.

Normally, values can be reconstructed correctly inside the SFOV. Outside the SFOV, however, the images are smeared in radial direction, specifically by reconstructed values that have extremely low probability of belonging to the object (see FIG. 2). The problem of truncated projections can therefore be denoted as a poorly formulated problem. The regularization of the cost function $\epsilon$ is required in order, nevertheless, to find a satisfactory solution.

Thus, the cost function $\epsilon$ must be expanded by a second term that contains a regularization term R(X) from the very first $$\epsilon = \|Y - AX\|^2 + \beta \cdot R(X) \quad (3)$$

and which punishes very improbable values. $\beta$ is a regularization parameter that is intended to strike a balance between the difference term and the regularization term. The negative logarithm of the a priori probability of the image for the regularization term is very well suited for a statistical reconstruction. The a priori information item frequently consists in that pixels differ only slightly from one another in a specific neighborhood. Since the aim in medical imaging is to reconstruct human bodies, it is therefore possible to use as a priori information item the logarithmic probability function of the attenuation values of human tissue.

In order to keep R(X) as simple as possible, it is to be assumed that the values (pixel/voxel) of the reconstructed image are uncorrelated. In accordance therewith, R(X) can be written as $$R(X) = -\log\left(\prod_i pdf(x_i)\right) = -\sum_i \log(pdf(x_i)) \quad (4)$$

with $pdf(x_i)$ as probability density of the attenuation value of the ith voxel. The cost function supplemented by R(X) can be minimized by means of gradient descent methods.

The determination of the basic probability density function can be performed in a number of ways:
1) stipulation by the user;
2) determination of the probability density function by evaluating histograms
   a) for whole objects
   b) for typically specific scans of an object (for example head scan, thorax scan etc.)

3) determination of the probability density function by calculating the histogram in the inner region of the image to be reconstructed.

When the user stipulates the probability density function, it is assumed that the user knows exactly the composition of the object to be examined, and can consequently assign the attenuation coefficients to probabilities. If the object does not consist of materials that can be assigned to discrete attenuation coefficients, the probability density function can be estimated by histograms. Use can be made in this case of the histogram for an entire body.

If, however, it is known that only a specific subregion of the body is to be examined such as the cranium, for example, only (partial) histograms corresponding to this subregion need be used for estimating probability density functions. The probability density function can, moreover, be determined from the inner region of the image to be reconstructed that lies inside the measuring field, since said region can generally be exactly reconstructed. In order only to use the information of neighboring pixels/voxels for the reconstruction, the calculation of the histogram to be used can also be restricted only to the surroundings of the pixel/voxel to be reconstructed. It is advantageous to this end to use only one outer ring of the SFOV in order to calculate the histograms, the ring additionally further being subdivided into segments for which a histogram is calculated separately in each case. The histogram of the next segment, or a linear combination of the two next segments, can then be used as probability density function that is to be used for a specific pixel. The measured histogram can additionally further be suitably smoothed in order to avoid undesired secondary minima and secondary maxima in the cost function to be minimized.

Figure 1:
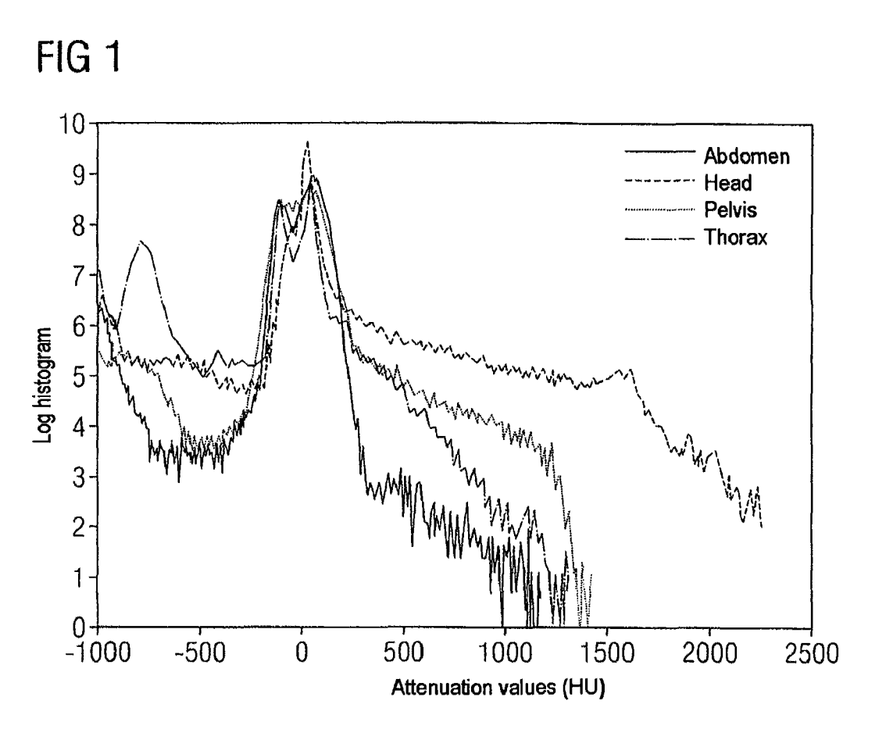
FIG. 1 shows four typical logarithmic histograms of the human body relating to the abdomen (abdominal region), head, pelvic region and thorax (chest)

The logarithmic probability function of human tissue can be estimated by analyzing the histograms of reconstructed images. As may be seen from FIG. 1, the histograms considered differ from one another as a function of the region to be reconstructed. Even within one image, the histogram varies with the respective position. Thus, for example, the occurrence of lung tissue is extremely probable in a central region of a thorax image, whereas the occurrence of lung tissue is, however, extremely improbable in the edge region of these images.

It is therefore proposed according to an embodiment of the invention to make advantageous use for the reconstruction of histograms that have been specifically acquired for the reconstruction method to be carried out in the neighborhood of the voxels to be reconstructed.

As already described above for the problem of "not severely truncated projections", attenuation values inside the current SFOV can be calculated exactly. By comparison with other images, which are not current, these current images have the advantage that their projections have been acquired under the same conditions as the projections outside the SFOV. For this reason, the attenuation values inside and outside the SFOV should scarcely differ from one another, or be very similar to one another.

Figure 2:
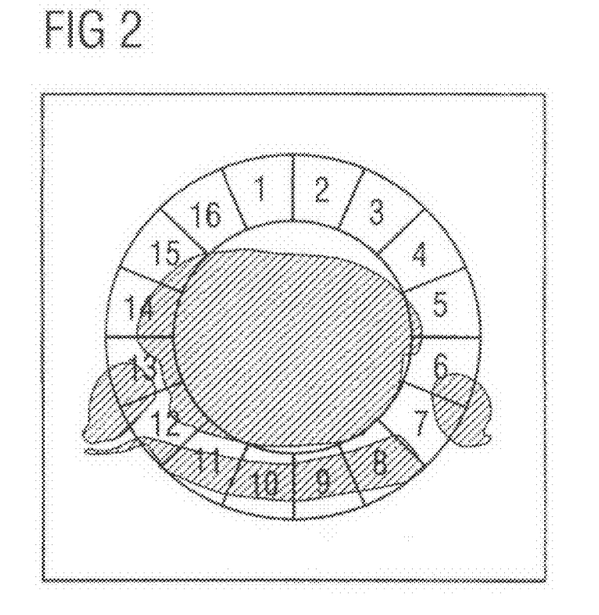
FIG. 2 shows a thorax picture, produced after 3 iterations with SART, on which a 16-segment ring has been superimposed in the edge region of the SFOV, one histogram being calculated for each segment.
Figure 3:
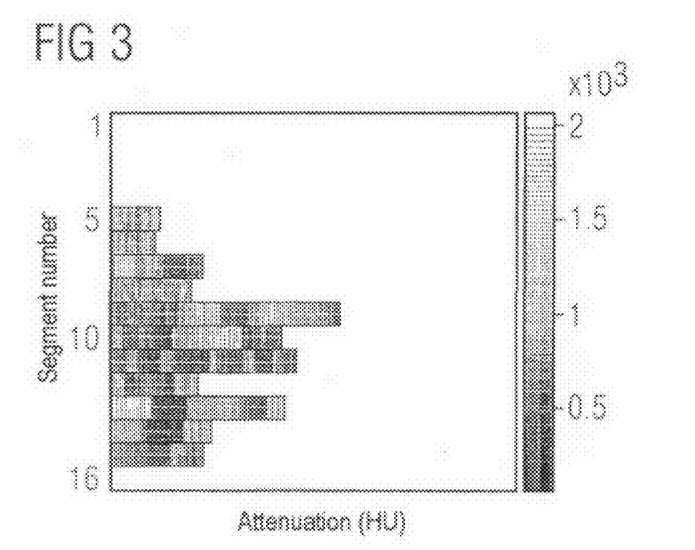
FIG. 3 shows the histograms, arranged next to or one above another by segment number, of the segments from FIG. 2 with a color- and/or brightness-coded attenuation value distribution of the pixels located in the respective segment.

A limit ring of the SFOV, that is to say a ring over the edge region of the image to be reconstructed, actually suffices in order to estimate the log probability function of the attenuation values in the edge region or outside the SFOV. When this ring is divided into segments, the aim being to calculate a dedicated histogram for each segment, the log probability function is determined by using only values that lie in the vicinity of the voxels that are to be reconstructed. FIG. 2 illustrates such a ring, which has sixteen segments. The geometry of this ring is selected such that the segments substantially cover the edge region of the object. For each segment, the attenuation value distribution of the pixels located in this segment is used as a basis for producing a histogram in which the attenuation value frequency is coded by a color and/or brightness shading. The histograms which are arranged next to one another or one above another by segment number are plotted in FIG. 3.

The calculated log probability functions are disturbed in general by loud noise, which leads to a function profile that has many local minima and maxima. Since, however, these functions constitute parts of the cost function that is to be minimized by gradient descent algorithms, these many local minima and maxima disturb and impair this minimization process. It is therefore absolutely necessary to smooth the respective log histogram or the approximation of the respective log histogram, in order to reduce the number of minima and maxima. The following method is proposed to this end according to an embodiment of the invention:

Only a few components are responsible for the actual form of a log histogram. Thus, log histograms usually have a peak attenuation of −1000 HU, specifically because of air and because of regions in which no object components are located. When a thorax scan is carried out, the log histogram has a peak in the surroundings of −800 HU, which represents lung tissue. The next peak, which occurs in principle in all scans (except for in scans in the head region), lies at −100 HU and originates from fat tissue.

In the region of 40 HU, the log histogram usually has a further peak, which originates from muscle tissue and diverse organs. The peak at 1000 HU is usually caused by bone tissue. The exact position of the peaks is a function of different parameters, for example of the energy of the x-rays, and can be determined by determining the global maximum from two sides in local surroundings. If no supposed maximum can be determined from two sides, the tissue belongs to a very questionable peak and most probably makes no contribution to the log histogram. However, according to convention a peak always exists at 0 HU. It guarantees that a voxel can still be assigned to, or classified as, "no object association". The attenuation values are less probable between these peaks, but the log histogram is usually also not zero. The minimum log probability function value can be determined by determining the local mean value in the middle of two neighboring maxima.

The highest attenuation value with a probability of greater than 0 is regarded as highest permitted value. The attenuation values of the reconstruction are limited to this value. Since measured data, therefore data affected by noise, are calculated, it is proposed not to add to 0 values that are smaller than 0, but to permit lower attenuation values in a certain range below 0, but with a decreasing lower probability.

Figure 4:
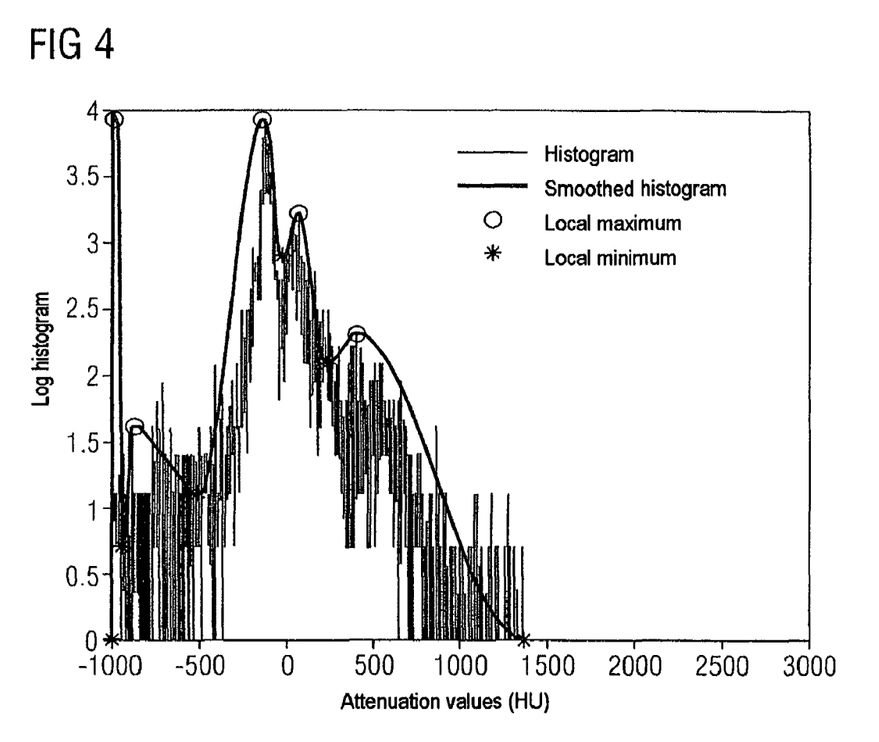
FIG. 4 shows a measured and smoothed histogram from the edge region of a thorax picture.

The values between two neighboring minima and maxima can be interpolated by a third-degree polynomial. The four coefficients of each of these polynomials are determined by position and value of the minima and maxima, and from the first derivatives that must assume a value 0 at the position of the minima and maxima. A smoothed measured histogram is illustrated in FIG. 4 for the purpose of better illustration of the method. The rings denote local maxima, the stars local minima. The smoothed histogram corresponds outstandingly to the shape of a histogram that has only a small number of extreme values.

Whereas the mean quadratic error between the calculated and measured projections constitutes a convex function (specifically the cost function $\epsilon$), the cost function between the pdf of human tissue is no longer a convex function, more specifically for the reason that the negative logarithmic probability function of human tissue has a number of minima separated by maxima.

Thus, it is very probable that no global minimum will be found during iteration. Instead, the solution found will rather be a local minimum. In order to arrive at a solution that lies as near as possible at the global minimum, it is proposed to introduce the regularization only for those values that lie outside the SFOV.

In a similar way, it is also possible to modify the cost functions of other known iterative reconstruction methods such as statistical reconstruction.

The method proposed according to an embodiment of the invention was checked against phantom studies and clinical studies. Use was made for the tests of a Siemens Emotion 16 Scanner having an SFOV of 50 cm. 20 iterations were carried out as a rule for all reconstructions illustrated.

Figure 5A:
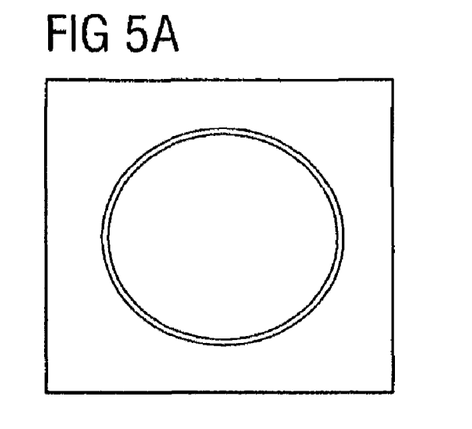
FIG. 5a shows an image, reconstructed with standard SART, of a water cylinder as phantom, the cylinder being contained completely in SFOV.
Figure 5B:
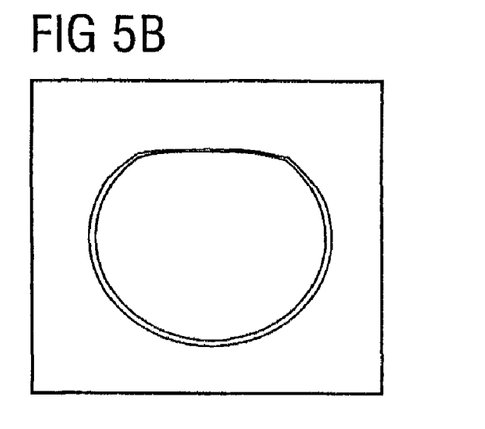
FIG. 5b shows the cylinder from FIG. 5a, the latter projecting by 3 cm from the SFOV in the upper region.

A cylindrical water phantom container of 20 cm diameter was used for the first test. The reconstructed images are shown in FIG. 5. The phantom was arranged such that it projected with its edge region 3 cm from the SFOV (FIGS. 5b-5d), and an image in which the phantom was arranged completely in the SFOV is shown in FIG. 5a for the purpose of better comparison. A standard SART reconstruction was used for FIG. 5a and FIG. 5b. The image was almost perfectly reconstructed or restored inside the SFOV. However, outside the SFOV the image is clearly smeared in a radial direction. The attenuation values decrease continuously from the edge of the SFOV up to the edge of the image, for which reason the edge of the phantom also cannot be exactly detected.

Figure 5C:
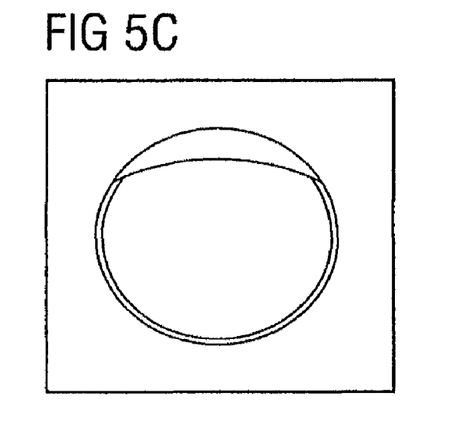
FIG. 5c shows a cylinder, reconstructed with the inventive method and projecting from the SFOV, with a β value of 0.0002.
Figure 5D:
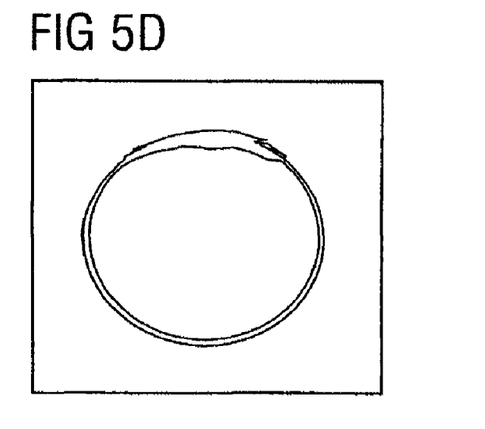
FIG. 5d shows a cylinder, reconstructed with the inventive method and projecting from the SFOV, with a β value of 0.00002.

By using the method proposed according to an embodiment of the invention, FIGS. 5c and 5d were reconstructed with $\beta=0.0002$ (5c) and $\beta=0.00002$ (5d). Because of the slow convergence, 200 iterations were carried out for (5d). The use of the method modified as proposed by the invention indicates significant improvements by comparison with the standard SART method. Thus, for example, the edge of the water cylinder can now be detected. The plastic cylinder around the water is no longer to be seen. The reason for this is that the attenuation value of plastic does not effect a noticeable peak in the histogram. For this reason, it is very improbable that this attenuation value may occur by comparison with that of water. Consequently, it is likewise improbable for this value to be incorporated into the reconstruction.

The phantom was virtually truncated by the SFOV during use of the standard SART method. The vertical dimension of the object was estimated to be higher only by two millimeters for use of the method according to an embodiment of the invention. However, the edges are still a little smeared or frayed. These small artifacts result from the fact that the cost function is no longer convex, and so is not a global minimum, but now a local minimum, is calculated and can be specified as the solution. In the images, the vertical extent of the water phantom, and the attenuation values inside a surface of 35×35 pixels were measured below the real upper edge of the cylinder.

The reconstructed values have approximately the same value as those inside the SFOV. They are underestimated by 38 HU, while the underestimation for the traditional conventional ART construction is approximately 299 HU. FIGS. 5c and 5d differ mostly from one another by the noise inside that part of the water phantom that comes to lie outside the SFOV. The standard deviation was measured inside a homogenous region of the water phantom inside the SFOV and outside the SFOV. The rising noise value inside the SFOV for the smaller $\beta$ value was caused because the number of iterations was higher than necessary by a factor of ten.

By using the higher $\beta$ value, the noise outside the SFOV was almost completely suppressed. The noise at lower $\beta$ values, in contrast, is comparable to the noise inside the SFOV. The reason for this behavior resides in that owing to the pdf the individual pixel tends to reach a local maximum in the pdf of the attenuation values. Less probable than this value are noisy values, which thereby undershoot an extended validity threshold. On the other hand, the SART part of the method attempts to distribute the noise values of the projections over the image such that the noise also occurs in the region of the reconstructed image outside the SFOV.

Figure 6:
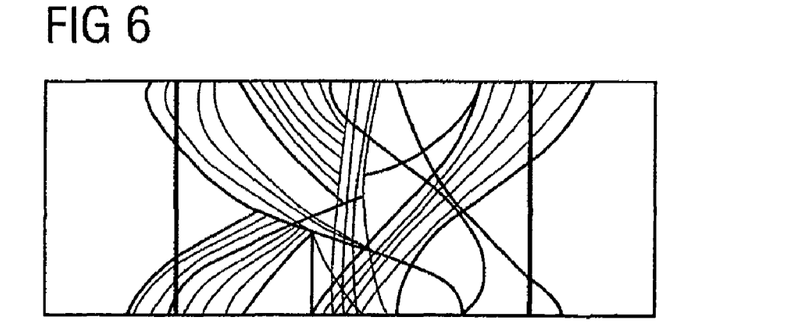
FIG. 6 shows a sinogram of a thorax phantom that is truncated on both sides by the vertical lines.
Figure 7:
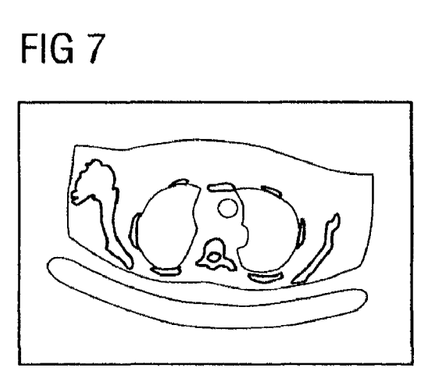
FIG. 7 shows an iteratively reconstructed image without truncated projections.
Figure 8:
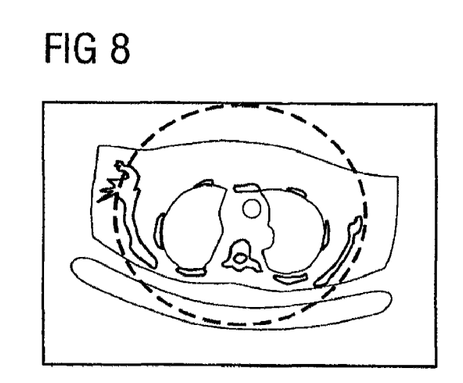
FIG. 8 shows an iteratively reconstructed image with truncated projections, the circle marking the SFOV.

It was possible in further experiments to check the efficiency of the method with regard to the reconstruction of projections truncated on both sides. To this end, the method was carried out on a thorax phantom, specifically by using 580 untruncated parallel projections imaged on 1344 channels with a data acquisition over a range of 180°. The parallel projections were calculated from measured fan beam projections by rebinning. These were truncated from 280 channels on either side, and so the thorax projected from the SFOV on both sides. The sinogram with the truncated edges is illustrated in FIG. 6. The reconstruction is illustrated in FIG. 7 in the case of untruncated projections. 20 iterations were used in turn for the calculation. In the case of a truncation as described above of the regions of the reconstructed image that come to lie outside the SFOV, the standard SART method again exhibits smearing in a radial direction (FIG. 8). Object boundaries are practically no longer visible. However—as can be seen with the aid of FIGS. 7 and 8—a perfectly reconstructed image could be produced inside the SFOV.

Figure 9:
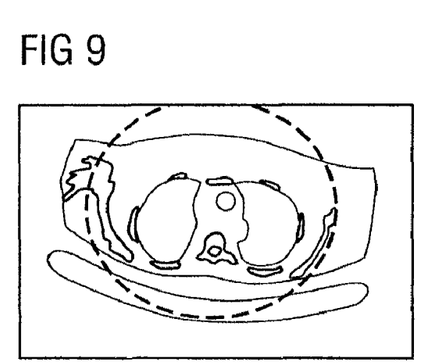
FIG. 9 shows an iteratively reconstructed image with truncated projections taking account of boundary conditions in accordance with the proposed method.
Figure 10:
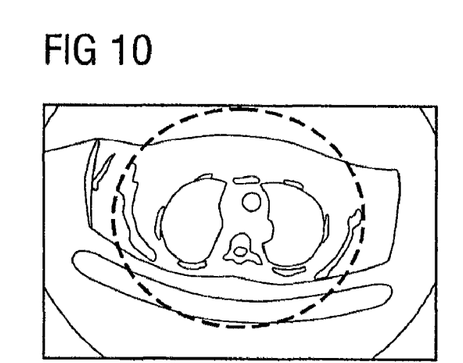
FIG. 10 shows a differential image between the image with truncated projections and the image without truncated projections.

FIG. 9 shows a reconstructed image produced iteratively by using the method proposed by the invention with 20 iterations. $\beta$ was set at 0.0002. The envelope or the edge of the object is now exactly visible. The difference image that is shown in FIG. 10 between the truncated and the untruncated case shows that the envelope of the object could be very well reconstructed. The extent of the body was overestimated on the left-hand side by 0.8 cm, and underestimated on the right-hand side by 0.1 cm. The body now has a small hole on the left-hand side in the vicinity of the bone. The reason for the overestimate on the left-hand side is the bone lying outside the SFOV. The values of the bone are partially smeared radially outward, and produce the artifacts. Nevertheless, with regard to the original image the bone is better displayed outside the SFOV by application of the proposed method.

Figure 11A:
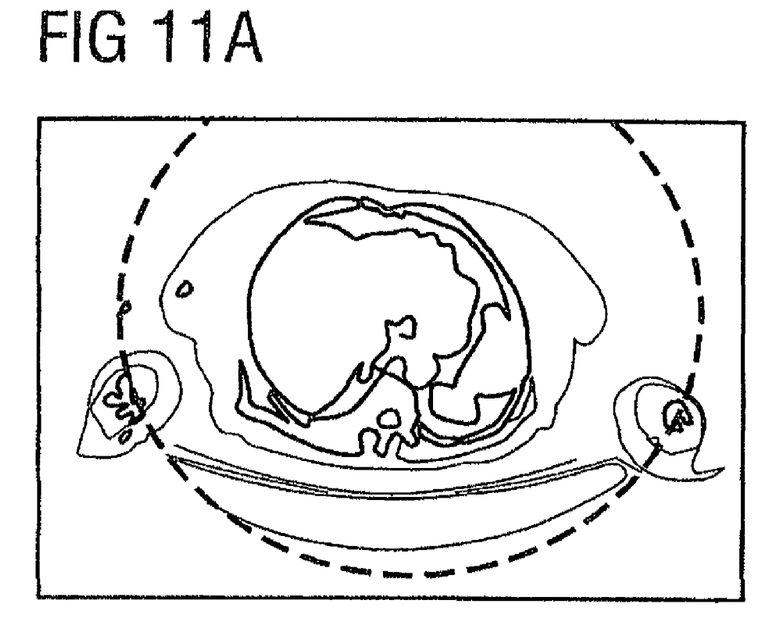
FIG. 11a shows the reconstructed image of a patient with regions of the arms outside the SFOV marked by the circle, use being made of the standard SART method.
Figure 11B:
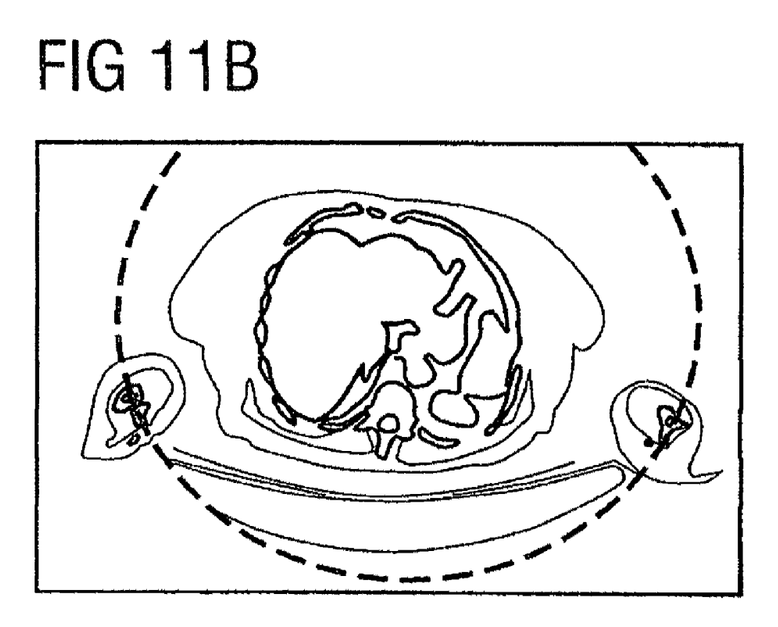
FIG. 11b shows the reconstructed image of a patient with regions of the arms outside the SFOV marked by the circle, use being made of the inventive SART method.

Furthermore, the proposed method was assessed with the aid of a clinical data record. Using 8 iterations, the images were reconstructed using both the standard SART method (FIG. 11a) and an embodiment of the proposed inventive method (FIG. 11b).

The value of $\beta$ was set to 0.0002 on the basis of considerations with regard to the rate of convergence. For this reason, only eight iterations were carried out: the first three iterations were carried out without boundary conditions.

Following therefrom, a histogram was measured in relation to each of the 16 segments and, as already described, smoothed. Thereafter—using the histograms as an a priori item of information—five iterations were carried out in the region lying outside the SFOV. Both the patient's arms lay partially outside the SFOV. The part outside the SFOV includes the most varied materials such as, for example, muscle tissue, fat, bone, etc. As could be observed in the case of phantoms on which the standard SART method was used, the attenuation values of the arms were radially smeared. The edges of the arms were not to be seen. These could be detected, however, by using an embodiment of the inventive method to reconstruct the edges of the arms.

It was likewise possible to distinguish very different types of tissue inside the arms. However, since a relatively high value for β was used, low-contrast details were no longer detectable. Furthermore, the noise characteristic of the parts inside and outside the SFOV differed and so these parts did not appear as natural as the inner region of the body.

Embodiments of the present invention thus include a method with which images that would normally have artifacts outside the SFOV because of truncated projections can largely be reconstructed in a fashion free from artifacts. An embodiment of the method uses the probability density function of human tissue, in which the attenuation value distribution is taken into account as a priori information about the object that is to be reconstructed. Investigations have shown that an embodiment of this method is capable of eliminating the artifacts outside the SFOV, and of reconstructing an image that is very similar to the original despite the use of a non-convex function.

It has been shown that the probability density function pdf that can be used to reconstruct the artifact-affected tissue projecting from the SFOV in a fashion free from artifacts can also be estimated and/or determined by the reconstructed values inside the SFOV.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
producing a 3D data record of an object on the basis of iterative calculation from a plurality of 2D data records generated tomographically on the object in association with a problem of truncated projections, wherein in a cost function to be minimized in the iterative calculation, in addition to a difference term, a regularization term is included that takes account of boundary conditions and in which a probability density function of attenuation values of components associated with the object are taken into account.

2. The method as claimed in claim 1, wherein the regularization term is determinable by assigning an appropriate probability to a discrete material composition of the object in accordance with an attenuation coefficient of the respective object component.

3. The method as claimed in claim 1, wherein the regularization term is estimated by a histogram at least one of over an entirety of the object and over a subregion of the object respectively of interest.

4. The method as claimed in claim 3, wherein the histogram is smoothed.

5. The method as claimed in claim 1, wherein the regularization term is estimated by a histogram over an inner region, lying inside an SFOV measuring field, of an image respectively to be reconstructed.

6. The method as claimed in claim 5, wherein the histogram is smoothed.

7. The method as claimed in claim 1, wherein the regularization term includes a multiplier by which a weighting is undertaken between the regularization term and difference term.

8. The method as claimed in claim 1, wherein only at least one of pixels, voxels and points, which cannot be calculated exactly owing to incomplete data from incomplete projection, is input into the cost function to be minimized.

9. The method as claimed in claim 1, wherein the producing is at least one of X-ray-based, magnetic resonance-based, ultrasound-based and optical tomographically based.

10. A non-transitory computer readable medium including program segments for, when executed on a computer device, causing the computer device to implement the method of claim 1.

11. An apparatus for producing a 3D data record of an object, comprising:
means for minimizing a cost function in an iterative calculation including, in addition to a difference term, a regularization term that takes account of boundary conditions and in which a probability density function of attenuation values of object components of the object are taken into account; and
means for producing a 3D data record of the object on the basis of the iterative calculation from a plurality of 2D data records generated tomographically on the object in association with a problem of truncated projections.

12. The apparatus as claimed in claim 11, wherein the means for producing is at least one of X-ray-based, magnetic resonance-based, ultrasound-based and optical tomographically based.

13. A method for producing a 3D data record of an object, comprising:
minimizing a cost function in an iterative calculation including, in addition to a difference term, a regularization term that takes account of boundary conditions and in which a probability density function of attenuation values of object components of the object are taken into account; and producing a 3D data record of the object on the basis of the iterative calculation from a plurality of 2D data records generated tomographically on the object in association with a problem of truncated projections.

14. The method as claimed in claim 13, wherein the producing is at least one of X-ray-based, magnetic resonance-based, ultrasound-based and optical tomographically based.

15. A non-transitory computer readable medium including program segments for, when executed on a computer device, causing the computer device to implement the method of claim 13.

16. A method for producing a 3D data record of an object on the basis of iterative calculation from a plurality of 2D data records generated tomographically on the object in association with a problem of truncated projections, the method comprising:

including in a cost function to be minimized in the iterative calculation, in addition to a difference term, a regularization term that takes account of boundary conditions and in which a probability density function of attenuation values of components associated with the object are taken into account.

17. The method as claimed in claim 16, wherein the producing is at least one of X-ray-based, magnetic resonance-based, ultrasound-based and optical tomographically based.

18. A non-transitory computer readable medium including program segments for, when executed on a computer device, causing the computer device to implement the method of claim 16.

* * * * *